April 8, 1952 R. A. RONCERAY 2,592,341
MOLDING MACHINE
Filed Sept. 10, 1948 7 Sheets-Sheet 1

Fig_1

Fig_8

INVENTOR
ROBERT A. RONCERAY
BY Linton and Linton
ATTORNEYS

April 8, 1952 R. A. RONCERAY 2,592,341
MOLDING MACHINE

Filed Sept. 10, 1948 7 Sheets-Sheet 2

INVENTOR
ROBERT A. RONCERAY
BY Linton and Linton
ATTORNEYS

Fig. 4

Patented Apr. 8, 1952

2,592,341

UNITED STATES PATENT OFFICE 2,592,341

MOLDING MACHINE

Robert André Ronceray, Thiais, France

Application September 10, 1948, Serial No. 48,605
In France January 20, 1948

4 Claims. (Cl. 22—29)

The present invention relates to moulding machines, pneumatic or the like, of the so-called shaking, pressure and unmoulding type, and, namely, but not exclusively, the machines which are intended for the moulding industry, and which are used for obtaining a mould starting from a model-plate.

In machines of this kind, a shaking movement or a vibration is utilized for the first pressing by inertia of the sand on the model-plate and then a pressure pressing, for perfecting the mould.

In the machines of the more pertinent type, the unmoulding is made either directly by raising the moulding box, or by holding the moulding box in its high position, after pressing, and by causing the model-plate to redescend, at the same time as the platform of the machine.

The machines of this kind have many disadvantages, namely for the part relating to the synchronisation of the guiding of the various devices: either the blocking of the moulding box during the unmoulding, or in the adjustment of the disengaging speed in the unmoulding, or finally in the control of the various movements, in order to carry out, in time, the various phases of a complete operation.

The present invention has for its object various improvements in machines of this kind in order to remedy the defects pointed out above and additional defects in these machines.

One improvement of the present invention is in that the guiding system of the table supporting the mould is formed by at least two rods, which are arranged in such a manner that the parts of these rods in frictional contact with the sleeves which support them are not the same during the ascending and descending movements of the assembly and during the slight alternate movements created during the vibration or shaking period.

A further improvement of this invention is in that a synchronisation system for the movement of the frame which supports the mould is provided, insuring a perfectly regular ascending and descending movement of the unmoulding device.

This synchronizing system comprises by preference guiding rods integral with the frame and the movements of which are synchronized. In one particular form of embodiment of the invention, two rack guiding rods are provided, integral with the frame which is to support the mould and the movements of which are synchronized by two pinions keyed on the same axle and both meshing with said rack rods.

In a machine of this kind, several successive operations have to be made, always in the same order. These operations are, in most cases, carried out by a control fluid under pressure.

Another characteristic of the invention consists in providing a special distributing valve which can send successively the operating fluid under pressure in the different elements of the machine. This distributor operates automatically and insures, in a positive manner, the succession of the operations in a predetermined order, without it being possible to omit a single one of these operations or to repeat one of them twice.

The invention consists also in grouping the tubes bringing the control fluid to the various working posts to be controlled, so as to control simultaneously the posts which are to operate together, and to insure automatically, preferably with the help of the distributor provided as above, the placing under working pressure of the posts which are not to operate at a certain time.

It is advantageous to combine this operating fluid distributor with a device connected to the evacuation tube of the compressed fluid after its use for braking the maneuvering fluid flow, which device insures a very slow start at the disengaging phase of the model-plate and of the mould, and a normal descending speed after this disengaging.

Other characteristics of the invention will be obvious however from the following specification together with the attached drawings giving non-limitative examples, and which will aid in understanding how the invention may be performed.

The moulding machine according to the invention comprises a frame 1, which has at 2, a cylinder for a piston 3 for the pressing. In this pressing piston is arranged a second piston 4 which ends at a collar 5. On this collar is screwed a table 6 by means of screws 7. Within the piston 4 is arranged a vibrator, of a known type, and which comprises a cylinder 8 in which moves a piston 9 which can knock successively two shock washers 10 and 11, between which it can slide freely, under the action of the operating fluid under pressure. The washer 10 being encased, as shown in the drawing, in the table 6.

The cylinder is closed, at its base, by a bell 12 into which a tube 13 is screwed and in which is arranged a rod 15 fixed at the bottom of the piston by a nut 16. This rod ends at a collar 17 which can abut on the bottom of the bell 12 and limit thus the ascending course of the piston 3.

On the rear face of the frame 1 is bolted a column 18, bearing at its upper part, a head 19, forming a traversing member, pivoting around the pivot 20. This traversing member comprising, at its end located above the table 6, a threaded member 21 in which screws a rod 22 fitted at its end with a plate 23.

The assembly thus formed—frame, column, traversing member, plate—forms a swan's neck adjustable in height by the member 21 and the bolt 22, in which are arranged, on the table 6, the model-plate and the moulding-box full of sand to be pressed.

In the wall of the piston 4 the conduit 24 is provided which, by appropriate openings, brings the controlling fluid under the piston 9 in order to lift it; the evacuation of this fluid to the open air is insured by the conduit 25 leading to the open air under table 6 and, the openings of which are uncovered at the end of the ascending stroke of the piston, at the same time as the intake openings of the conduit 24 are covered. Shocks having a very fast rate are obtained producing vibrations.

Figure 4:
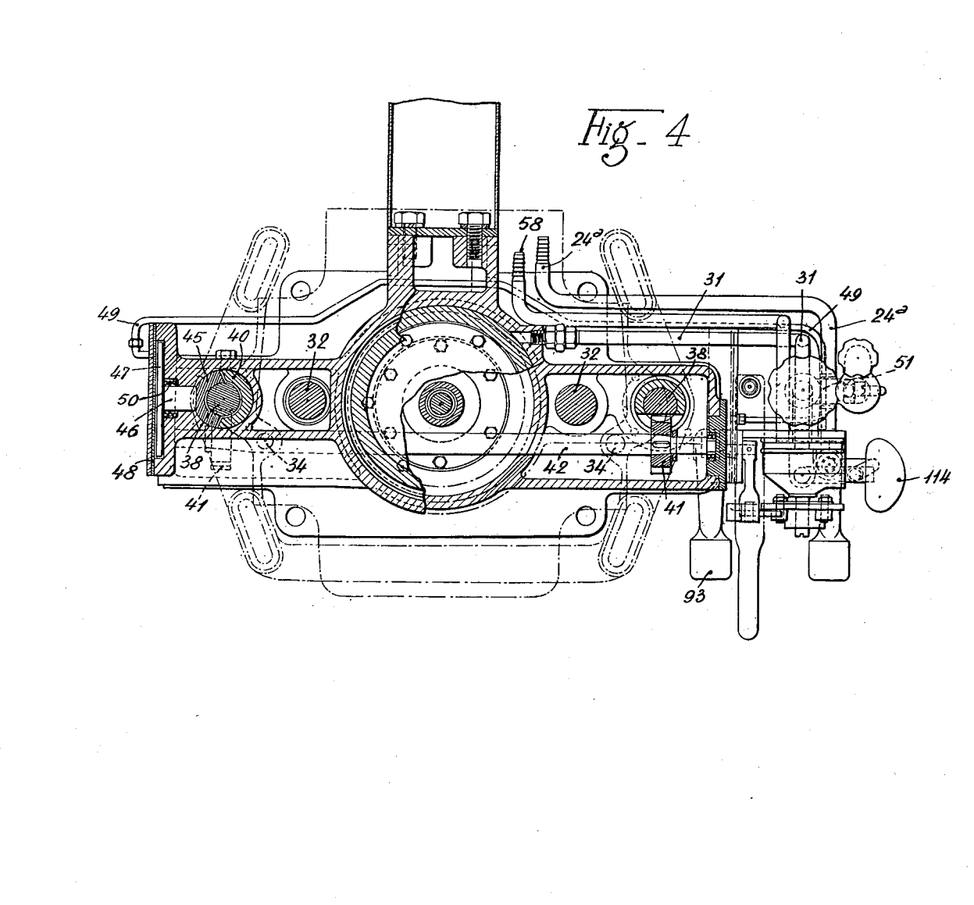
Fig. 4 is a cross-section, partly broken away, through IV—IV of Fig. 2.

The bore 24 is connected to conduit 24a Fig. 4 by a flexible tube connected to the vibro-pressing distributor which will be described hereinafter. The bore 26 is similarly connected to the tube 58 by flexible tubing.

The bore 26, drilled in the side of the collar 5 and in the wall of the piston 4, brings the control fluid into the chamber 27, and this fluid lifts the piston 4 with the assembled table-model and moulding-box, until this piston 4 uncovers the apertures 28 of the bores 29, the fluid escapes then by these bores, and the assembly falls back knocking on the upper part 30 of the piston 3. The intake cycle continuing, the operation starts again at a rate which depends on the section and on the number of apertures 28 and of the bore 29, in order to obtain shock without recoil. This is pressing by shaking. At the base of the cylinder 2 the opening of a tube 31 is provided, through which the motive fluid is sent after having stopped the shaking device which has just been described.

This tube 31 is in direct communication with the controlling fluid distributor, which will be more fully described later.

Under the action of this motive fluid, the piston 3 rises, raising the whole assembly which surmounts it and presses the mould and the model-plate against the plate 23.

During the upward stroke of the pressing piston 3, it is necessary to guide this ascending assembly in an appropriate manner, and particularly the table 6. This guiding is insured by two rods 32, which are formed integral with the plate 6.

These rods slide in sleeves 33, which are integral with the frame 1, on either side of the cylinder 2.

Under the slab 6 (Fig. 2) are also fixed two rods 34, ending in a base-head such as 35, on which bears a spring such as 36. These rods pass through a frame 37 which they can raise when the table 6 is raised through the thrust of the pressing piston. The springs 36 are then pushed by the base-heads 35 and press on the mentioned frame 37.

The frame 37 which is to hold the mould during the unmoulding must ascend and descend in a manner as even and as horizontal as possible.

For this purpose frame 37 is integral with two guiding rods 38 which are fixed on either sides of the frame and which bear each two racks 39. These two guiding racks slide in two sleeves 40 which are fixed to the frame 1, parallel to the pressing cylinder and on either side of the latter.

The two racks 39 integral with the rods 38 mesh with pinions 41 which are both keyed on the same axle 42. Therefore when the slab 6 rises, it lifts the frame 37 in a perfectly uniform manner, and the latter remains perfectly horizontal because of this guiding.

Thus pressing by vibration and pressing by pressure have been successively executed. The next step is therefore to do the unmoulding, that is to say, to remove the model-plate from the moulding-box filled with sand in which it is inserted.

In order to do this, the pressure under the piston 3 is withdrawn by means of the distributing device which will be hereinafter described. The table 6 descends carrying with it the model-plate and the moulding-box, the latter leaves the pressing plate 23 and comes to rest on the frame 37. By preference, it rests on two prop-elements 43, which are advantageously orientatable. These prop-elements are fixed on the frame 37, for example by nuts 44. In order that the frame may rest on the prop-elements 43, the frame 37 must first be immobilized.

In order to effectuate this stopping of the frame, the stopping simultaneously of each of the guiding rods 38 in its sleeve 40 is necessary and for this, a semi-circular shoe 45 is utilized, which is pushed by a piston 46 having a head 47 of a relatively large diameter and which is in contact with a membrane 48. The compressed air can be admitted by the tube 49 which ends at the hereinbefore mentioned control fluid distributor.

Naturally, the air is sent to the surface of the membrane 48 opposite to the piston head 47, and the latter is urged towards the membrane by a spring 50 bearing on the frame of the apparatus.

The pressure exerted by the shoe, on the rod 38, depends, on one hand, on the control fluid pressure working against the membrane 48, and, on the other hand, on the ratio between the surface of the shoe acting on the rod 38 and the surface of the piston head 47.

It is then noticed that it is possible to obtain a braking effect related to the weight of the devices to be blocked, that is the frame and moulding-box. It is not necessary to obtain large movements, since it is sufficient to make up for the very small play between the shoe and the rod 38.

The moulding-box being supported on the frame prop-elements 43, the disengaging of the model-plate must be carried out, so as to be able to remove this plate from the moulding-box. The vibrator is therefore put into operation (piston 9, Figs. 10 and 11) and at the same time the control fluid which is under the piston 3 is evacuated by letting this air escape by a valve 51 illustrated more in detail in Figs. 10 and 11, and which will be described hereinafter.

In order to obtain a correct unmoulding, it is evidently necessary that the descending movement of the model-plate be carried out absolutely without any play, and this is where the two guiding rods 32 come into play.

During the shaking operation, these rods slide at a fast rate in their sleeve 33, but on a relatively short length. They are therefore subjected to a wear which is more intense on the mentioned parts.

According to the invention, this friction is allowed during the shaking operation, only on a certain part of the periphery of the sleeves and of the rods, so that the part of the rods 32 which does not rub during the shaking operation is without play during the downward stroke of the model-plate on the rest of the periphery of the sleeves 33.

Figure 2:
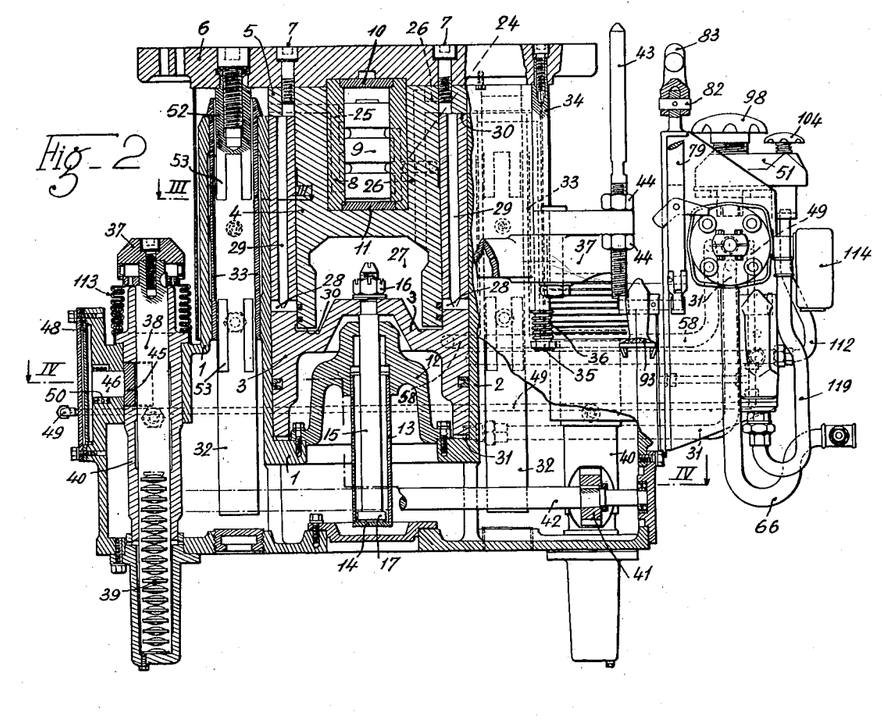
Fig. 2 is a longitudinal cross-section through II—II of Fig. 1.

In this regard these sleeves 33 have been designed very long, with, as shown namely in Fig. 2, a bearing point at each end, which is sufficiently long to insure a good guiding of the rods 32, which, even when up at the end of the upward stroke, must remain engaged with the upper part of the sleeves 33 in their lower part.

Figure 3:
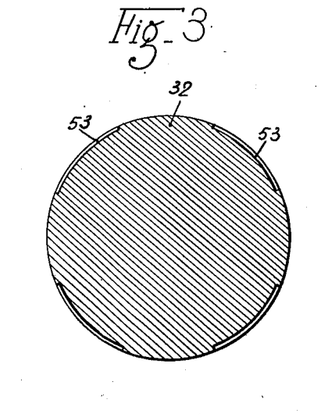
Fig. 3 is a transverse cross-section of the guiding device, through III—III of Fig. 2.

In their upper part 52, the rods 32 are machined so as to have a diameter slightly smaller than the sleeves 33, on a length at least equal to the shaking stroke, in order to prevent initial wear of the upper end of the sleeves, owing to the repeated frictions due to the shaking phase. Hollow parts having the form of longitudinal grooves 53 (Fig. 3) have been formed on these same rods 32. These grooves constituting for instance 50% of the circumference of the rods, and these grooves being arranged at the top of the rubbing parts of the sleeves during the shaking stroke, so that the rubbing of the rods 32, during this operation, only take place on the protruding parts of the rod 32 and only on the corresponding parts of sleeve 33. But the parts of the sleeve opposite slots 53 will remain untouched by the rod, and thus will not be submitted to wear during such stroke. It follows that these last named sleeve parts will remain able to insure a precise guiding of the unslotted portion of rod 32 during the draw stroke, when such unslotted portion will be brought up to the height of the said last named sleeve parts. The purpose of the slots 53 is thus to spare, on the circular portion of the sleeve 33 used during the shaking stroke, longitudinal protruding unworn portions, located opposite said slots during said shaking stroke, which protruding unworn portions act as a precise guide for the unslotted portion of the rod during the draw stroke.

As soon as the unmoulding is carried out, that is to say as soon as the piston 3 has returned to its low position, as well as the table 6, the moulding-box is removed and the braking of frame 37 is released and this frame returns in turn to its primary position.

It has been stated that, in the hereinbefore described machine, the control fluid must successively be sent to various posts, that the starting of the various posts is always carried out in the same order and that the order of operation of these various posts must not be inter-changed, any false operation, in this sense, ending fatally in a defective execution of the moulding.

It is therefore greatly advantageous to synchronize, in a manner independent from the will of the operator utilizing the machine, the sending of the control fluid to the various posts concerned, so that this operator cannot make a mistake.

For this purpose a rotary distributor is provided which will send this control fluid to the various posts in the logical order of the operations to be carried out, without the possibility of omitting the control of a single one of these posts or to interchange the predetermined order of operation.

Another characteristic of this distributor consists in that only the posts which are to operate are under pressure at the proper moment, whereas the others are still connected to exhaust. This prevents a leak, either at the distributor, or at the cylinder joints or at any other place, causing the undesired operation of a post other than the one which is to be actuated.

The distributor according to the invention is illustrated in Figs. 5 to 9.

The distributor concerned comprises (Fig. 7) a seat or stator 54 perforated by three apertures 55, 56 and 57 connected by tubes 58, 31 and 49 to different utilizing posts of the machine, that is to say respectively to the shaking (58) to the pressing (31) and to the braking (49).

This stator comprises a surfaced and glazed surface 59, and on the bottom an airtight cap 60, in which is mounted rotatively a rotor 61.

Figures 1, 8:
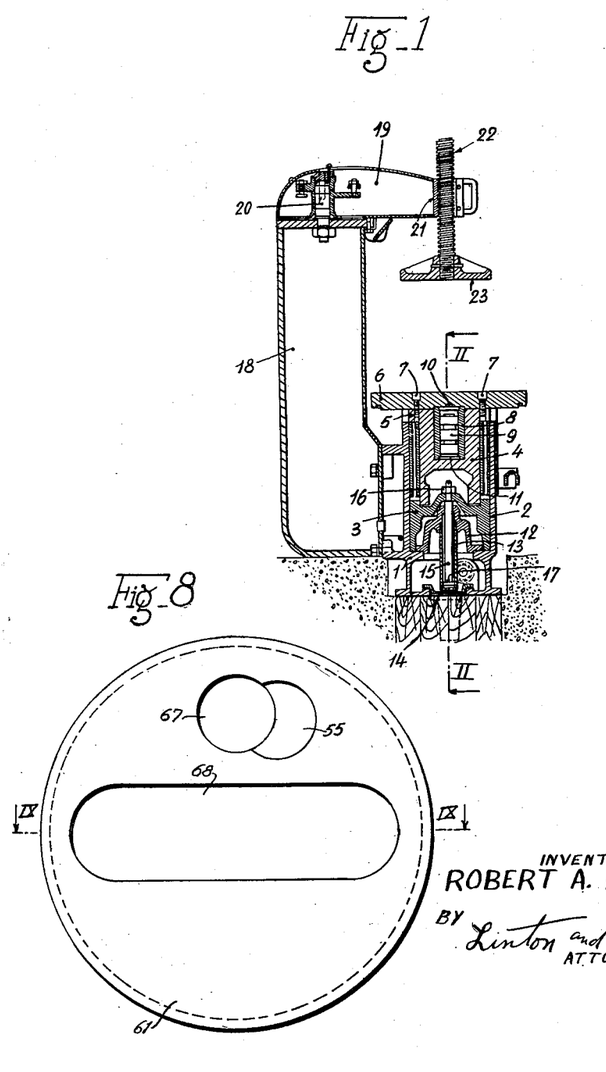
Fig. 1 is a cross-sectional elevation of one embodiment of the invention.
Fig. 8 is a rear view of the face of the rotor.
Figures 5, 9:
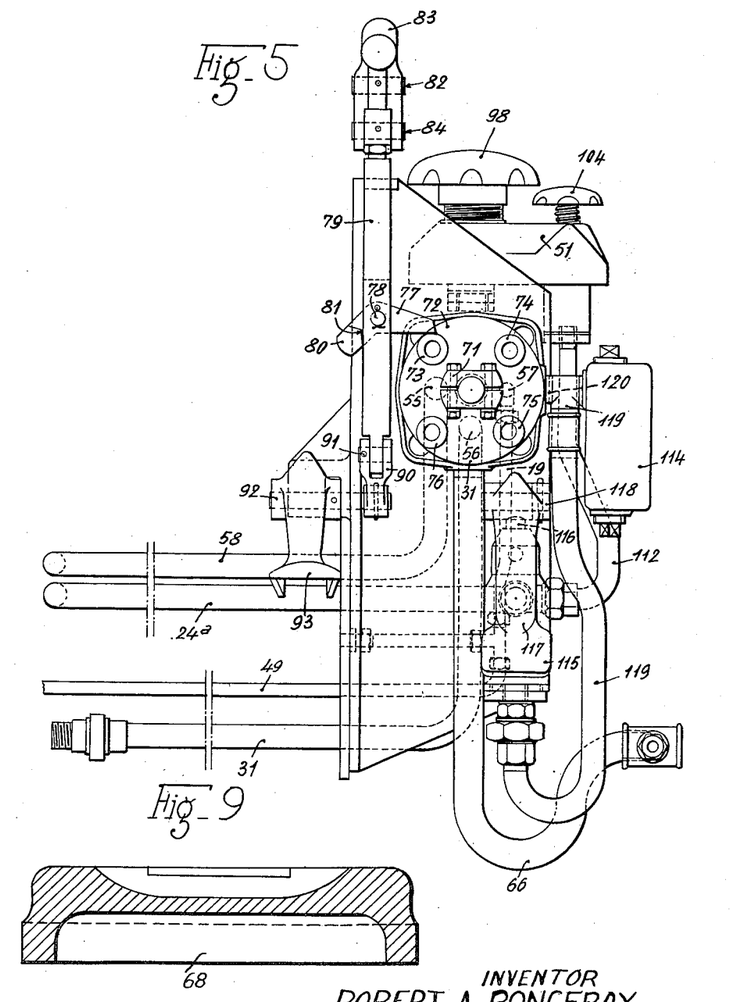
Fig. 5 is a front elevational view of the air distributing device.
Fig. 9 is a cross-section through IX—IX of Fig. 8.

In the inner chamber 64 of the cap the control fluid under pressure is introduced by tube 65. This rotor, more fully illustrated in Figs. 8 and 9, is perforated by an opening 67, which can be successively brought, by rotation of this rotor, opposite one of the openings 55, 56, or 57 of the stator, and puts thus in communication the corresponding opening with the chamber 64 and permits the admission of the control fluid to the post which is to be put in operation. This rotor comprises, moreover, in its diametral part, a slot 68 occupying only a part of its thickness (Fig. 9) and which covers all the openings, with the exception of that which is opposite the opening 67, as well as the evacuation opening 69 located at the center of the stator. This evacuation opening is extended by a tube 94 conducting the fluid to a special valve hereinafter described.

The rotation of this rotor is carried out in the following manner:

An axle 70 passes through the cap 60 in an airtight manner and it is supported by bearings 71. On this axle 70 is fixed a plate 72 provided with four protruding rollers 73, 74, 75 and 76. These rollers are set at 90° from each other. The rotation of the plate 72 is controlled by an index 77 connected in its middle in 78 on a rod 79, and the end of which, the farthest from the rollers has an appropriate weight so as to insure the withdrawal of the index 77 for the passage of the following roller and which comprises a surface 81 pressing against the rod 79 so as to limit the descending movement of the part 80 of this index. The rod 79 is connected in 82 on a lever 83, which lever is itself connected at 84 to a boss 85 of the frame of the machine. On the side opposite to the connected part 82 there is provided a rod 86 connected at 87 on the end of the lever 83 and on which is slid a spring 88. This spring bears, at its lower-end, on a washer 89 integral with the rod 86 and, at its other end, on one part of the frame. It tends therefore to maintain the connected part 87 at its lowest point.

When it is desired to lower the lever 83 it is necessary, first to compress the spring 88 and, simultaneously, to cause the rod 79 to descend, so that the finger 77 pushes the roller 73 so as to entrain it downwards.

The plate 72 has thus, at this moment, executed a rotation of ¼ of a turn bringing the orifice 67 of the rotor opposite the following opening 56 of the stator.

Figure 6:
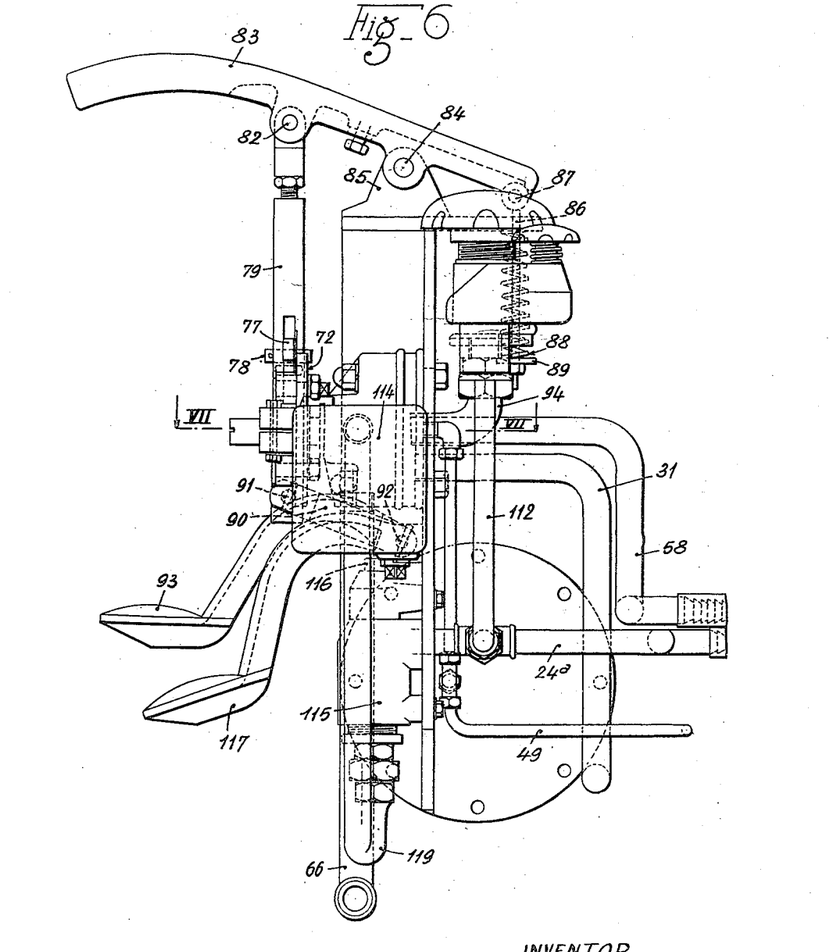
Fig. 6 is a lateral view corresponding to Fig. 5.
Figure 7:
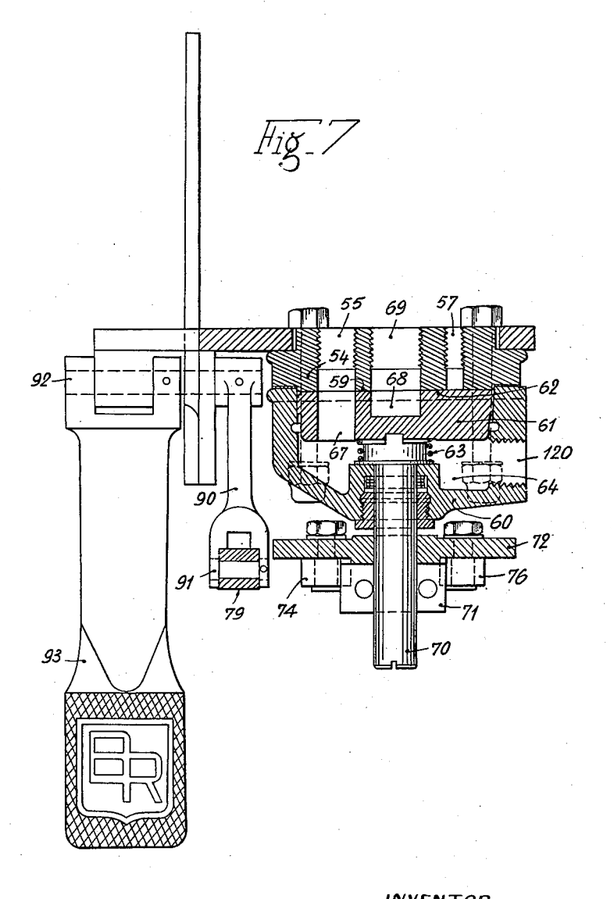
Fig. 7 is a partial cross-section through VII—VII of Fig. 6.

When the pressure on the lever is stopped, the spring 88 when expanding, returns, as it is easy to see, the lever 83 to the position illustrated in Fig. 6.

For several reasons, namely in the case where the operator should have his two hands occupied, it is advantageous to be able to operate the valve described by foot.

In this connection the rod 79 is, at its lower end, connected on a connecting rod 90 by means of an axle 91 and this connecting rod is in turn clamped on a shaft 92. A pedal 93 is keyed on said shaft, so that any lowering of the pedal causes the rod 79 to go down and, consequently to cause the plate 72 to advance.

Of course, either the control by lever, or the control by pedal may be used, separately, or else any other devices, for instance an electrical device utilizing relays.

The distributor concerned, in the example illustrated, does not control the operation of the vibrator (piston 9) as the latter is started by a special valve 115, the push rod of which is controlled by a second pedal 117, pivoting in 118. The tube 24a starts from this valve which is supplied with control fluid from the chamber 64 of the distributor, by the conduit 119.

Figure 10:
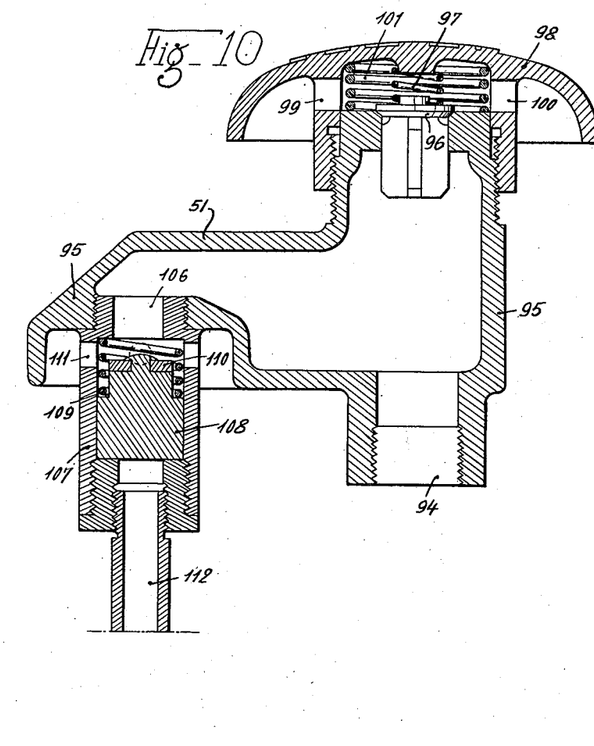
Figs. 10 and 11 are two elevational cross-sections of the air slowing device.
Figure 11:
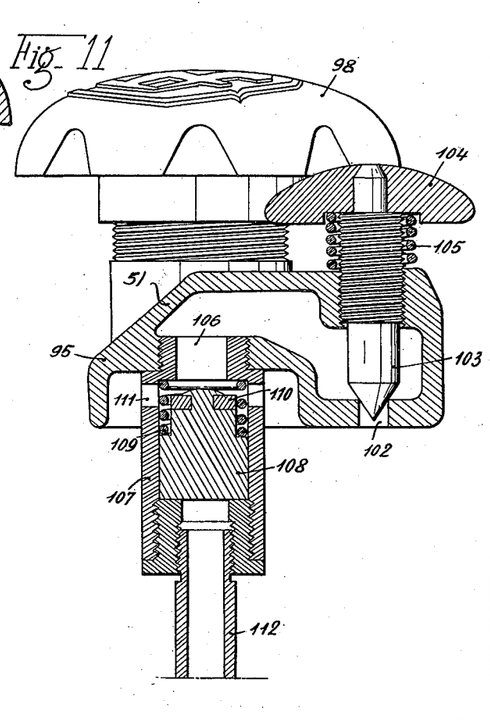

The evacuation tube 69 of the distributor is connected to a valve 51 by a tube 94, which valve is more fully illustrated in Figs. 10 and 11. This valve comprises a body 95. In this body is arranged a valve 96 held on its seat by a spring 97 bearing under an adjusting bell 98, which screws on the body 95 and comprises evacuation apertures such as 99 and 100. A braking spring 101 is interplaced between the cap of this bell and the body 95 so as to avoid the loosening and adjustment which could happen due to the jars and vibrations of the machine.

In this body 95 is also provided an opening 102 issuing outside and which can be closed by a needle 103 actuated by a handwheel 104 located externally and which is held in place by a braking spring 105. A third opening 106 formed in the body 95 communicates with a cylinder 107 in which moves a piston 108, which moves against a spring 109. This piston 108 can close the opening 106 when it is at its high position and it supports a plastic washer 110 for forming a joint. The spring 109 tends to maintain the piston 108 in its low position uncovering thus the aperture 111. The cylinder 107 is connected at its lower part by the tube 112 to the air intake conduit to the vibrator.

When the pressing has been carried out, and consequently, the piston 3 ceases to ascend, the unmoulding is started. For this, the vibrator is put into operation, the unmoulding device is braked and the pressing cylinder is put into the evacuation position whereupon the air arrives to the valve described in Figures 10 and 11, under the piston 108 which it raises, thus closing the opening 106 of the body 95.

On the other hand, the air arrives from the distributor 54 by the opening 94. It lifts the valve 96 and escapes through the openings 99 and 100 until the pressure, which decreases progressively in the body 95 is overcome by the opposed spring 97 of the valve 96 and then, the valve closes again. The pressure in the pressing cylinder 2 has fallen to a given value for which the unmoulding has not yet started. This value is still greater than the weight of the parts which are to descend.

Because of the needle 103, there is however a slight leakage of the control fluid through the opening 102, so that the pressure tends towards zero with an adjustable speed. The result of this is that the pressure decreases in a corresponding manner in the pressing cylinder, this permitting a very slow descending movement of the latter. Thus the model-plate is disengaged.

When this disengaging has been done, the vibrator is stopped and connected to the evacuation tube whereupon the pressure is no longer exerted under the piston 108 which descends under the thrust of its spring 109.

The conduits such as 111 are then in communication with the opening 106 and the control fluid which was in the cylinder 2 can thus escape freely with the pressing piston and the table 6 of the machine descending rapidly. The moulding-box resting on the prop-elements is then removed from the frame and at the same time the distributor is actuated so as to connect the braking to the evacuation. The frame redescends then to its low position, and the machine has resumed its idle position.

Naturally it comes within the scope of the invention to provide protecting bellows on the different parts of the machine which are exposed to receive sand during the filling of the moulds and this is the reason for the protective bellows 113 (Fig. 2).

In the case where compressed air is utilized as control fluid, it is advantageous to provide an air degreaser 114 communicating with the air intake to the rotary distributor through the aperture 120.

The model-plate and the molding box containing the sand are placed on the table 6, and compressed air is forwarded to the vibrating device, piston 9, and afterwards to the shaking device, piston 4. The sand is thus compressed in the molding box by vibrations and shaking.

The plate 23 having been adjusted at a little distance from the moulding box, the table 6 is lifted by piston 3 so that the mould-box and the model-plate are pressed against plate 23, the sand being thus pressed against the model plate.

Then the unmoulding takes place. To this end, the piston 3 is allowed to go down, while the frame 37 is immobilized so that the mould-box rests upon elements 43. The model plate remains on the table 6 and is thus separated from the mould-box. The mould-box and the model-plate being then taken away, the frame 37 is freed, and a new operation can take place.

As above indicated, all these operations are accomplished in the correct order by means of the distributing described hereinbefore.

What I claim is:

1. A moulding machine of the jolt-squeeze type comprising in combination a fixed stand provided with an adjustable upper plate, a movable lower plate supporting a pattern plate and a mould box, a cylinder mounted on said stand, a first piston movable in said cylinder, a second piston movable within said first piston and attached to said movable plate, a vibrator mounted within said second piston adjacent to said movable plate, means mounted on said stand for guiding the movement of said movable plate, said guide means including a sleeve and a guide rod having longitudinal slots in certain portions traveling in said sleeve, a movable supporting frame for said mould box, synchronizing means for regulating the motion of said frame, means for coupling said frame to said movable plate during their upward strokes, braking means for stopping the motion of said frame during the downward strokes of said movable plate, an exhaust pipe connected to said cylinder below said front piston for the escape of fluid therebeneath, a distributing chamber into which control fluid under pressure is admitted, said chamber having a plurality of openings formed in the top thereof, pipes connecting said chamber openings to the various members to be controlled and with an exhaust port, a rotor arranged within said chamber adjacent said top, said rotor being provided with an opening adapted to be successively brought opposite to each of said top openings, a radial slot formed in the surface of said rotor adjacent to said top, said slot being adapted to connect that opening corresponding to the exhaust to at least one of the remaining openings, a control device adapted to drive said rotor in a discontinuous rotative motion, a shaft having said rotor keyed on one end thereof and the other end of which is external to said chamber, a plate connected to said external end of said shaft and provided with protruding nipples, a movable finger cooperating with each of said nipples for rotating said plate and said shaft, and means for controlling the escape of fluid from said cylinder exhaust pipe through said distributing chamber and consequently the initial downward stroke of said lower plate.

2. A moulding machine of the jolt-squeeze type comprising in combination a fixed stand provided with an adjustable upper plate, a movable lower plate supporting a pattern plate and a mould box, a cylinder mounted on said stand, a first piston movable in said cylinder, a second piston movable within said first piston and attached to said movable plate, a vibrator mounted within said second piston adjacent to said movable plate, means mounted on said stand for guiding the movement of said movable plate, said guide means including a sleeve and a guide rod having longitudinal slots in certain portions traveling in said sleeve, a movable supporting frame for said mould box, synchronizing means for regulating the motion of said frame, means for coupling said frame to said movable plate during their upward strokes, braking means for stopping the motion of said frame during the downward strokes of said movable plate, an exhaust pipe connected to said cylinder below said first piston for the escape of fluid therebeneath, a distributing chamber into which control fluid under pressure is admitted, pipes connecting said openings to the various members to be controlled and to an exhaust port, a rotor arranged within said chamber adjacent to said top, said rotor being provided with an opening adapted to be successively brought opposite to each of said top openings, a radial slot formed in the surface of said rotor adjacent to said top, said slot being adapted to connect the particular opening corresponding to the exhaust to at least one of the remaining openings, a control device adapted to drive said rotor in a discontinuous rotative motion, a shaft having said rotor keyed on one end thereof with the opposite end extending externally of said chamber, a circular plate keyed on said external end of said shaft and provided with protruding nipples, an index, a second shaft having said index connected thereto, said index being adapted to drive said nipples during downward strokes of said second shaft and to pass clear of said nipples during upward strokes of said second shaft, a control member connected to said second shaft, and means for controlling the escape of fluid from said cylinder exhaust pipe through said distributing chamber and consequently the initial downward stroke of said lower plate.

3. A moulding machine of the jolt-squeeze type comprising in combination a fixed stand provided with an adjustable upper plate, a movable lower plate supporting a pattern plate and a mould box, a cylinder mounted on said stand, a first piston movable in said cylinder, a second piston movable within said first piston and attached to said movable plate, a vibrator mounted within said second piston adjacent to said movable plate, means mounted on said stand for guiding the movement of said movable plate, said guide means including a sleeve and a guide rod having longitudinal slots in certain portions traveling in said sleeve, a movable supporting frame for said mould box, synchronizing means for regulating the motion of said frame, means for coupling said frame to said movable plate during their upward strokes, braking means for stopping the motion of said frame during the downward strokes of said movable plate, an exhaust pipe connected to said cylinder below said first piston for the escape of fluid therebeneath, a distributing device adapted to send control fluid under pressure successively to said second piston, said first piston and said braking means and to connect these members to the exhaust duct of said distributing device, a controlling chamber connected through said distributor exhaust duct to said cylinder, said controlling chamber having four connected openings formed in the wall thereof, a valve mounted in said chamber for closing one of said outlet openings, a spring tending to close said valve being calibrated to a pressure of a valve higher than the pressure allowing for the downward motion of said first piston, an adjustable needle for partially closing a second of said openings, a piston located opposite to third of said openings, a calibrated spring urging said piston away from said third opening, a duct on said chamber leading to the side of said piston opposite to said spring, a pipe connecting said chamber duct to said vibrator, a pipe connecting the fourth of said openings to the exhaust port of said controlling device.

4. A moulding machine of the jolt-squeeze type comprising in combination a fixed stand provided with an adjustable upper plate, a movable lower plate supporting a pattern plate and a mould box, a cylinder mounted on said stand, a first piston movable in said cylinder, a second piston movable within said first piston and attached to said movable plate, a vibrator mounted within said second piston adjacent to said movable plate, a plurality of rods connected to said movable plate, a plurality of sleeves mounted on said stand and each having one of said rods slidably mounted thereon, each sleeve being in contact with its corresponding rod in two peripheral zones only of said sleeve, said rods each having corresponding peripheral zones being slotted in such a manner that when said rod approaches and is at its lower positions it is in contact with its sleeve only on corresponding portions of the periphery of both rod and sleeve, said rods being unslotted on the parts of its length located outside of said corresponding peripheral zones, a movable supporting frame for said mould box, synchronizing means for regulating the motion of said frame, means for coupling said frame to said movable plate during their upward strokes, braking means for stopping the motion of said frame during the downward strokes of said movable plate, an exhaust pipe connected to said cylinder below said first piston for the escape of fluid therebeneath, a distributing device adapted to send control fluid under pressure successively to said second piston, said first piston and said braking means and to connect these members to the exhaust duct of said distributing device, and means for controlling the escape of fluid from said cylinder exhaust pipe through said distributing chamber and consequently the initial downward stroke of said lower plate.

ROBERT ANDRÉ RONCERAY.

REFERENCES CITED

The following references are of record in the file of this patent:

UNITED STATES PATENTS

| Number | Name | Date |
|---|---|---|
| 1,277,745 | Nicholls | Sept. 3, 1918 |
| 1,472,807 | Nicholls | Nov. 6, 1923 |
| 2,376,203 | Stemmler | Mar. 15, 1945 |

FOREIGN PATENTS

| Number | Country | Date |
|---|---|---|
| 186,379 | Great Britain | Sept. 25, 1922 |
| 224,324 | Great Britain | Nov. 13, 1924 |
| 328,012 | Great Britain | Apr. 16, 1930 |
| 569,142 | Great Britain | May 7, 1945 |
| 864,797 | France | Feb. 3, 1941 |